US006973128B2

(12) United States Patent
Zhou et al.

(10) Patent No.: US 6,973,128 B2
(45) Date of Patent: Dec. 6, 2005

(54) MULTI-PATH TRANSMISSION OF FINE-GRANULAR SCALABILITY VIDEO STREAMS

(75) Inventors: Jian Zhou, Seattle, WA (US); Huai-Rong Shao, Cambridge, MA (US); Chia Shen, Lexington, MA (US)

(73) Assignee: Mitsubishi Electric Research Labs, Inc., Cambridge, MA (US)

( * ) Notice: Subject to any disclaimer, the term of this patent is extended or adjusted under 35 U.S.C. 154(b) by 417 days.

(21) Appl. No.: 10/371,086

(22) Filed: Feb. 21, 2003

(65) Prior Publication Data
US 2004/0179598 A1 Sep. 16, 2004

(51) Int. Cl.$^7$ .............................................. H04N 7/12
(52) U.S. Cl. ............ 375/240.11; 375/240; 375/240.01; 375/240.12; 375/240.25
(58) Field of Search ........................... 375/240.11, 240, 375/240.01, 240.12, 240.16, 240.25

(56) References Cited

U.S. PATENT DOCUMENTS 6,700,933 B1 * 3/2004 Wu et al. ............... 375/240.16

OTHER PUBLICATIONS

Li, "Overview of Fine Granularity Scalability in MPEG-4 Video Standard," IEEE Trans. on Circuits and Systems for Video Technology, vol. 11, No. 3, pp. 301-317, Mar. 2001.
Wu et al., "A Framework for Efficient Fine Granularity Scalable Video Coding," IEEE Trans. on Circuits and System for Video Technology, vol. 11, No. 3, pp. 332-344, Mar. 2001.
Zhang et al., "Constant Quality Constrained Rate Allocation for FGS Video Coded Bitstreams," Visual Communications and Image Processing 2002, Proceedings of SPIE, vol. 4671, pp. 817-827, 2000.
Van der Schaar et al., "A Hybrid Temporal-SNR Fine Granular Scalability for Internet Video," IEEE Trans. on Circuits and System for Video Technology, vol. 11, No. 3, pp. 318-331, Mar. 2001.
Wang et al., "Error Control and Concealment for Video Communication: A Review," Proceedings of the IEEE, vol. 86, No. 5, pp. 974-997, May 1998.
Wang et al., "Error Resilient Video Coding Techniques," IEEE Signal Processing Magazine, pp. 61-82, Jul. 2000.
Wang et al., "Channel-Adaptive Error Control for Scalable Video over Wireless Channel," The 7th International Workshop on Mobile Multimedia Communications (MoMuC) 2000, Oct. 2000.
Van der Schaar et al. "Unequal packet Loss Resilience for Fine Granularity Scalability Video," IEEE Trans. on Multimedia, vol. 3, No. 4, pp. 381-394, Dec. 2001.
Pham et al., "Multi-path routing protocol with load balancing policy in mobile ad hoc network," 4th International Workshop on Mobile and Wireless Communications Network, 2002.

(Continued)

*Primary Examiner*—Allen Wong
(74) *Attorney, Agent, or Firm*—Dirk Brinkman; Andrew J. Curtin

(57) ABSTRACT

A method transports a video over a network that includes multiple paths. First, a video is encoded into a base layer, one or more low bit-rate enhancement layers, and one or more high bit-rate enhancement layers using fine-granularity scalability. The base layer and the low bit-rate layers are duplicated into a multiple base layers and multiple low bit-rate enhancement layers, respectively. The high bit-rate layers are partitioned into multiple partial low-bit rate layers, and then each layer is transmitted over a different path of the network to a receiver.

11 Claims, 3 Drawing Sheets

OTHER PUBLICATIONS

Reibman et al., "Transmission of Multiple Description and Layered Video over an EGPRS Wireless Network," ICIP 2000, pp. 136-139, 2000.

Zheng et al., "Wireless Video Performance Through BLAST Testbed," VTC 2001, pp. 141-146, 2001.

Kamaci et al., "Multiple description coding with multiple transmit and receive antennas for wireless channels: the case of digital modulation," Global Telecommunications Conference, 2001, GLOBECOM '01. IEEE, vol.: 6 pp. 3272-3276, 2001.

Yan et al., "Macroblock-based Progressive Fine Granularity Spatial Scalability (mb-PFGSS)," ISO/IEC JTC1/SC29/WG11, MPEG2001/M7112, Mar. 2001.

* cited by examiner

100

MULTI-PATH TRANSMISSION OF FINE-GRANULAR SCALABILITY VIDEO STREAMS

FIELD OF THE INVENTION

This invention relates generally to streaming compressed videos, and more particularly to transmitting fine-granular scalability streaming of videos over multiple network paths.

BACKGROUND OF THE INVENTION

For applications that stream a compressed video over a network, such as the Internet, one important concern is to deliver the video stream to a receiver with different resources, access paths, and processors. Therefore, content of the video is dynamically adapted to heterogeneous environments found in such networks.

Fine-granular scalability (FGS) has been developed for the MPEG-4 standard to adapt videos to such dynamically varying network environments, see "ISO/IEC 14496-2: 1999/FDAM4, "Information technology—coding of audio/visual objects, Part 2: Visual." An overview of this amendment to the MPEG-4 standard is described by Li, "Overview of Fine Granularity Scalability in MPEG-4 Video Standard," IEEE Trans. on Circuits and Systems for Video Technology, Vol. 11, No. 3, pp. 301–317, March 2001.

An MPEG-4 FGS encoder generates two bitstreams: one is a base layer stream, and the other is an enhancement layer stream. The purpose and importance of the two bitstreams are different. The base layer stream provides a basic decoded video. The base layer stream must be correctly decoded before the enhancement layer stream can be used. Therefore, the base layer must be strongly protected. The enhancement layer stream can be used to improve the quality of the basic video.

FGS coding is a radical departure from traditional scalable encoding. With traditional scalable encoding, the content is encoded into a base layer bitstream and possibly several enhancement layers, where the granularity is only as fine as the number of enhancement layers that are formed. The resulting rate-distortion curve resembles a step-like function.

In contrast, FGS encoding provides an enhancement layer bitstream that is continually scalable. Reconstructed frames of the base layer bitstream are subtracted from the input video generates the enhancement layer bitstream. This yields an FGS residual signal in the spatial domain. Discrete cosine transform (DCT) encoding is applied to the residual signal. Then the DCT coefficients are coded by a bit-plane coding scheme. Bit-plane coding can generate multiple sub-layers for the enhancement layer bitstream. Hereinafter, the sub-layers are also referred to as enhancement layers. Bit-plane encoding allows the enhancement layer bitstream to be truncated at any point. Thus, the quality of the reconstructed video is proportional to the number of bits that are decoded from the enhancement layer bitstream.

FGS provides continuous rate-control of the streaming video because the enhancement layer bitstream can be truncated at any point to achieve a target bit-rate. Another advantage of the FGS, compared to traditional scalable coding schemes, is its error resiliency. Losses or corruptions in one or more frames in the decoded enhancement layers do not propagate to following frames. Following frames are always first decoded from the base layer before the enhancement layers are applied.

FGS effort has focused on the following areas: improving coding efficiency, see Kalluri, "Single-Loop Motion-Compensated based Fine-Granular Scalability (MC-FGS)," MPEG2001/M6831, July 2001, and Wu et al., "A Framework for Efficient Fine Granularity Scalable Video Coding," IEEE Trans. on Circuits and System for Video Technology, Vol. 11, No. 3, pp. 332–344, March 2001; truncating the enhancement layers to minimize quality variation between adjacent frames, see Zhang et al., "Constant Quality Constrained Rate Allocation for FGS Video Coded Bitstreams," Visual Communications and Image Processing 2002, Proceedings of SPIE, Vol. 4671, pp. 817–827, 2000, Cheong et al., "FGS coding scheme with arbitrary water ring scan order," ISO/IEC JTC1/SC29/WG11, MPEG 2001/M7442, July 2001, and Lim et al., "Macroblock reordering for FGS," ISO/IEC JTC1/SC29/WG11, MPEG 2000/M5759, March 2000; and modifying the FGS coding structure to add time scalability, see Van der Schaar et al., "A Hybrid Temporal-SNR Fine Granular Scalability for Internet Video," IEEE Trans. on Circuits and System for Video Technology, Vol. 11, No. 3, pp. 318–331, March 2001, and Yan et al., "Macroblock-based Progressive Fine Granularity Spatial Scalability (mb-PFGSS)," ISO/IEC JTC1/SC29/WG11, MPEG2001/M7112, March 2001.

The problem of protecting the FGS stream has also been addressed. Various techniques are available for encoding and transmitting the base layer, see Wang et al., "Error Control and Concealment for Video Communication: A Review," Proceedings of the IEEE, vol. 86, No. 5, pp. 974–997, May 1998, and Wang et al., "Error Resilient Video Coding Techniques," IEEE Signal Processing Magazine, pp. 61–82, July 2000.

An adaptive forward error correcting code (FEC) can be used to protect the FGS enhancement layers, see Wang et al., "Channel-Adaptive Error Control for Scalable Video over Wireless Channel," The 7th International Workshop on Mobile Multimedia Communications (MoMuC) 2000, October 2000. Unequal error protection can also be used to transport the FGS bitstreams, see Van der Schaar et al. "Unequal packet Loss Resilience for Fine Granularity Scalability Video," IEEE Trans. on Multimedia, Vol. 3, No. 4, pp. 381–394, December 2001.

A big challenge for transmitting a streaming video is instantaneous congestion in the network. Theoretically, FGS can adapt dynamically to the available bandwidth by measuring characteristics of the network end-to-end, and estimating its components. However, in many cases, the duration of the congestion is shorter than the time it takes to measure and estimate to effectively adapt the FGS video stream.

FEC and re-transmission can sometimes recover packets lost due to the instantaneous congestion. However, both of these solutions can also aggravate congestion by introducing additional traffic.

Numerous multi-path technologies are known for both wired and wireless networks, see Cidon et al., "Analysis of Multi-path Routing," IEEE/ACM transaction on Networking," Vol. 7, No. 6, pp. 885–896, December 1999, Su et al., "Dynamic multi-path routing: asymptotic approximation and simulations," ACM SIGMETRICS Performance Evaluation Review, Volume: 29, Issue: 1, pp. 25–36, June 2001, and Pham et al., "Multi-path routing protocol with load balancing policy in mobile ad hoc network," 4th International Workshop on Mobile and Wireless Communications Network, 2002.

In those cases, each path may have a lower bandwidth, but the total available bandwidth is higher than a single path.

Multiple description coding (MDC) has been developed to transport a standard (non-FGS) compressed video stream over multiple independent paths. In MDC, different descriptions of the content of the video are transmitted over each path. Because errors occur independently in the different paths, the probability that all paths incur the same error is low, see Wang et al., "Error Resilient Video Coding Techniques," IEEE Signal Processing Magazine, pp. 61–82, July 2000. MDC techniques for transporting video streams over multiple wireless channels are also known, see Reibman et al., "Transmission of Multiple Description and Layered Video over an EGPRS Wireless Network," ICIP 2000, pp. 136–139, 2000, Zheng et al., "Wireless Video Performance Through BLAST Testbed," VTC 2001, pp. 141–146, 2001, and Kamaci et al., "Multiple description coding with multiple transmit and receive antennas for wireless channels: the case of digital modulation," Global Telecommunications Conference, 2001, GLOBECOM '01. IEEE, Volume: 6 pp. 3272–3276, 2001.

However, none of the known prior art techniques describe how to transmit an MPEG-4 FGS compressed video stream over multiple path of a network.

Therefore, it is desired to provide a system and method for transmitting an FGS video stream over multiple paths so that errors and instantaneous congestion are reduced.

SUMMARY OF THE INVENTION

A method transports a video over a network that includes multiple paths. First, a video is encoded into a base layer, one or multiple low bit-rate enhancement layers, and one or multiple-high bit-rate enhancement layers using fine-granularity scalability.

The base layer and the low bit-rate layers are duplicated into multiple base layers and multiple low bit-rate enhancement layers.

The one or more high bit-rate layers are partitioned into multiple partial low-bit rate layers, and then each layer is transmitted over a different path of the network to a receiver.

DETAILED DESCRIPTION OF THE PREFERRED EMBODIMENT

System Structure

Figure 1:
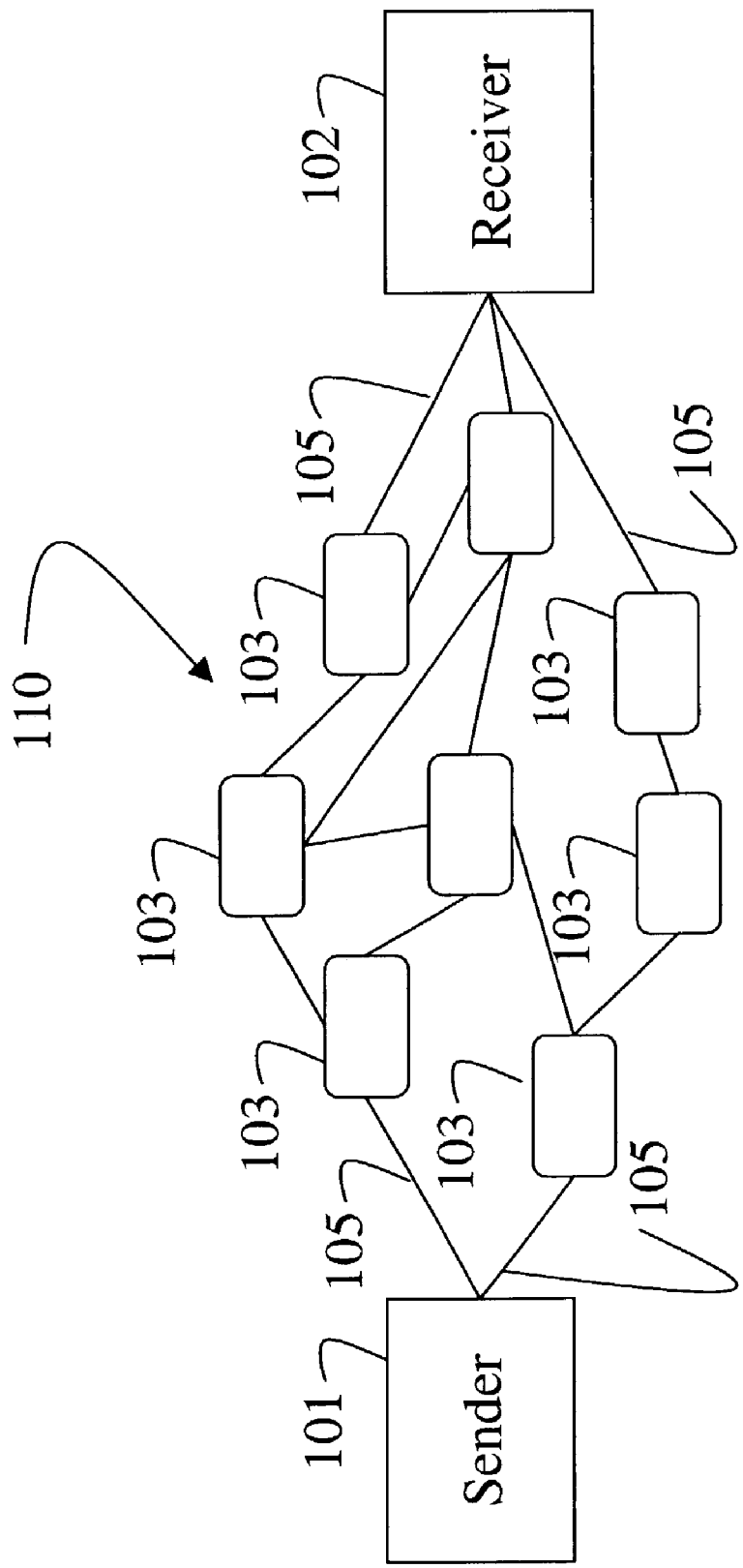
FIG. 1 is a block diagram of a communications system that uses the invention.

FIG. 1 show a communications system 100, such as the Internet, that can use our invention. The system 100 includes a sender 101, a receiver 102, a network 110 including multiple nodes 103, e.g., routers and bridges, all connected by multiple paths 105. Our invention provides a method for transmitting an MPEG-4 fine-granular scalability (FGS) video stream over the multiple paths 105 of the network 110.

System Operation

Figure 2:
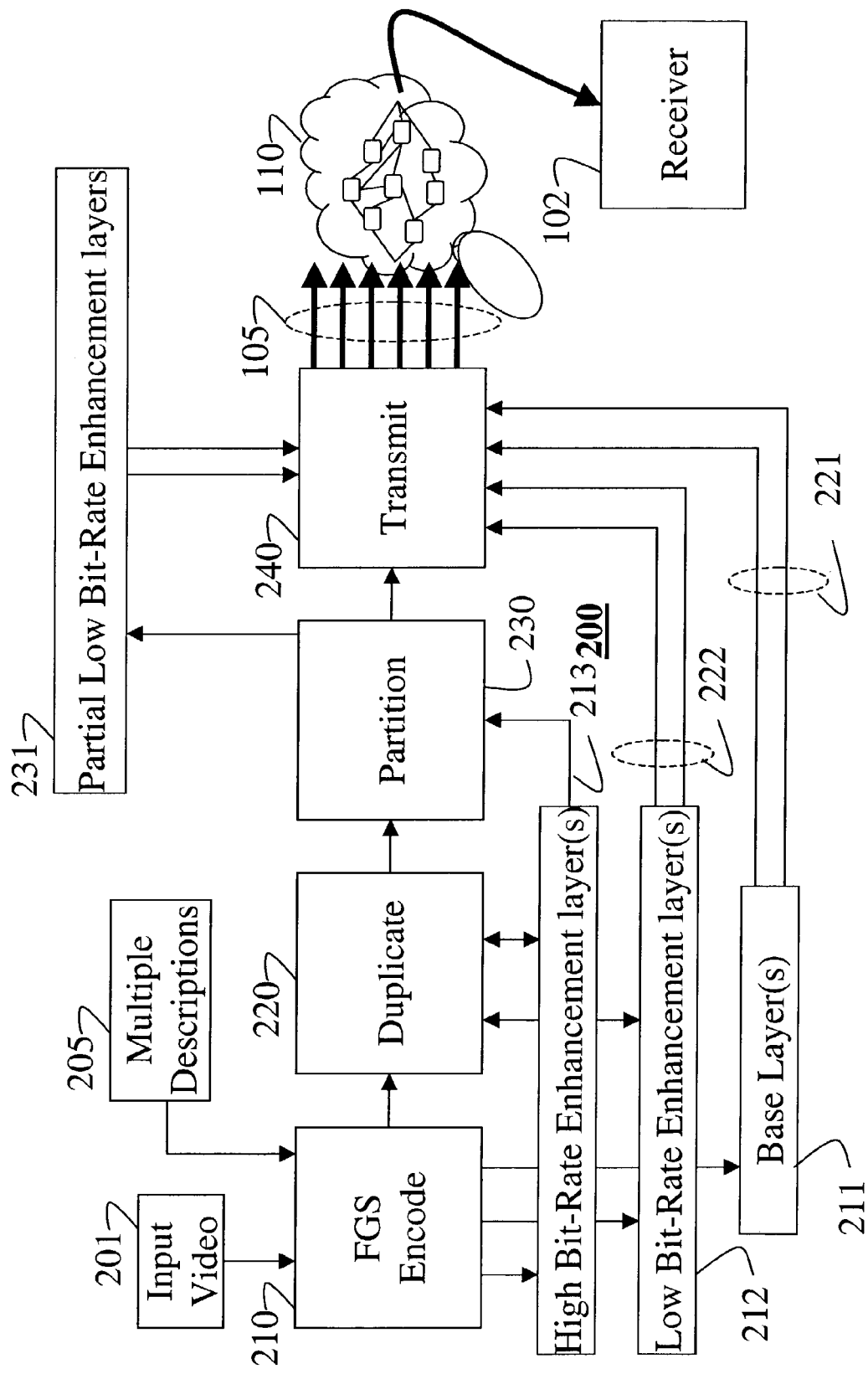
FIG. 2 is a flow diagram of a method for transmitting an FGS video stream over multiple paths of a network according to the invention.
Figure 3:
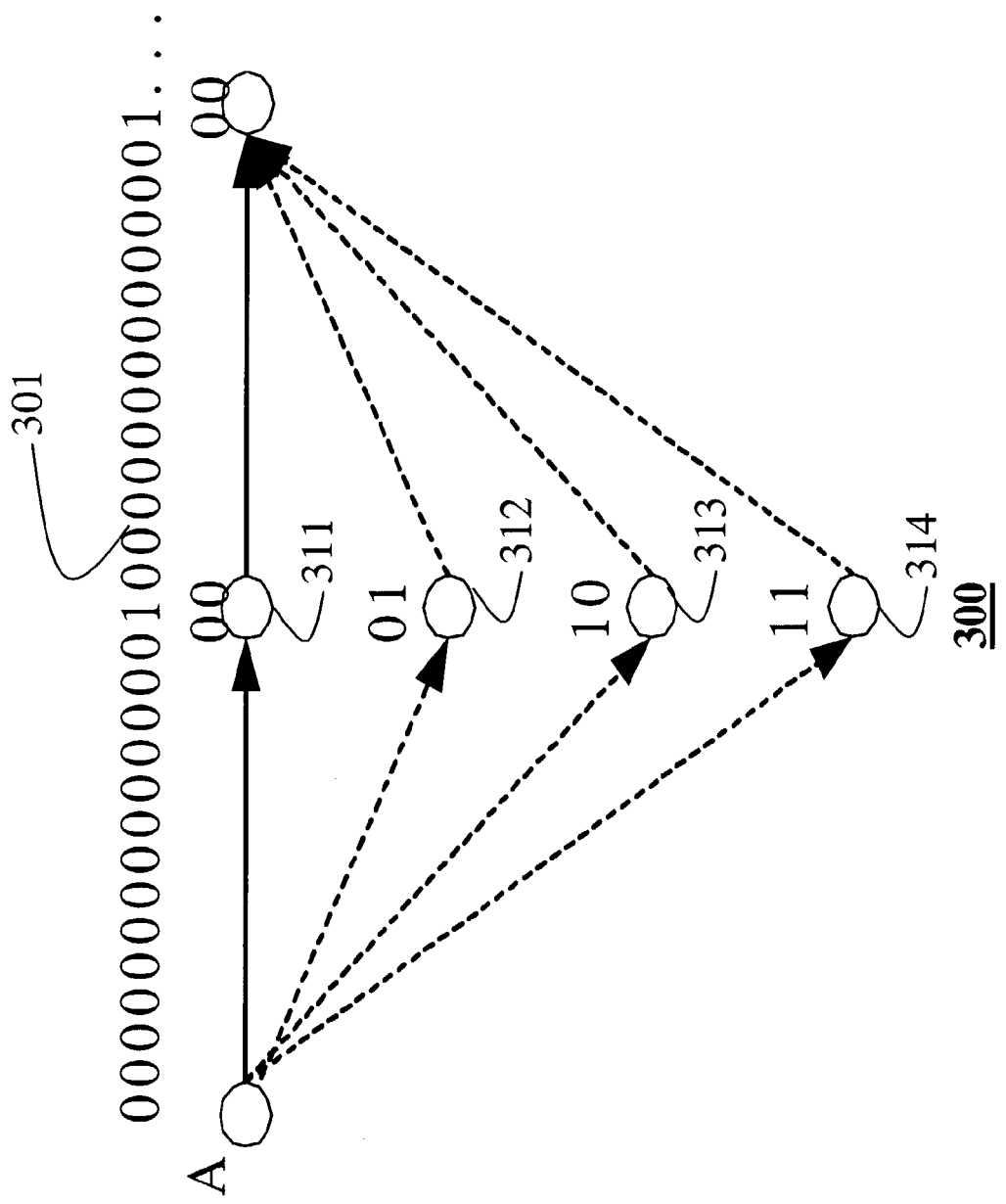
FIG. 3 is a diagram of a trellis used by the invention.

FIG. 2 shows a method 200 according to our invention. An input video 201 is encoded 210 using fine-granularity scalability into a base layer 211, and one or more low bit-rate enhancement layers 212, e.g., less than about 30 to 40 Kbps. Each of the bitstreams 211–212 is duplicated 220 into multiple streams 221–222 for transmission 240 over the multiple paths 105 of the network 110 to the receiver 102.

One or more high bit-rate enhancement layers 213 are encoded 210, using multiple descriptions 205, and then partitioned 230 into partial high bit-rate layers 231 for transmission 240 over the multiple paths 105 of the network 110 for delivery to the receiver 102.

Statistical Analysis of Bit-Rates and Errors

The idea behind our invention results from a careful statistical analysis of characteristics of encoded FGS bit-streams. We begin by encoding standard video sequences such as "Coast Guard" and "Akiyo." Coast Guard shows a boat moving through highly textured water, and Akiyo shows a fairly static news announcer against simple background. The sequences are encoded in a common-intermediate-format (CIF) by setting a quantization parameters Q of the base layer to 31 for both I frames and P frames. There are no B frames in these two standard video sequences.

For the base layer (BL), and the low bit-rate enhancement layers such as EL1 and EL2, which carry the information of large residual errors, the bit-rate is relatively low, e.g., about 31.3 Kbps and 6.8 Kbps, respectively. However, for enhancement layers EL3 and up, the bit-rate can be hundreds of Kbps. Consequently, the peak average signal-to-noise ratio (PSNR) of the entire sequence increases significantly. For instance, the EL3 bit-rate is about six times of the bit-rate of the base layer, and the EL7 bit-rate is over eighteen times of the base layer bit-rate. In other words, there is a significant difference between the rates of the low and high bit-rate streams.

Because of the small bandwidth requirement, it is reasonable to use forward error correction (FEC) or other known error protection schemes to protect the base layer 211 and the low bit-rate enhancement layers 212. More overhead-bits are required to protect the high bit-rate enhancement layers 213. However, as stated above, the network often encounters instantaneous congestion. This causes the high bit-rate enhancement layer to be truncated when the bandwidth is limited, and the quality of the decoded video is substantially decreased. In such cases, the prior art schemes are not effective to protect the high bit-rate enhancement layers 213.

Multiple Paths

In a congested network, it may be easier to find several lower bandwidth paths than to find a single large bandwidth path. Therefore, we duplicate the streams, and transmit 240 the multiple streams 221–222, 231 over multiple paths 105. Using the multiple path solution according to our invention also decreases the likelihood that packets are lost.

One could simply duplicate the original video content for each path. This would improve the robustness of the video transmission, because a packet lost in one path can be recovered from other paths. However, if the bandwidth of each path is insufficient, then only a low quality video can be reconstructed. Another simple solution could partition video stream into non-overlapping stream, and use a different path for each stream. This would improve the transmit bit-rate. However, if a packet is lost in any path, then the corresponding lost information cannot be reconstructed.

Therefore, we provide the method 200 for transmitting an MPEG-4 FGS video stream over the multiple path 105 of the network.

Duplication of Base Layer and Low Bit-Rate Enhancement Layers

The base layer 211 and low bit-rate enhancement layers 212 of the input video 201 are encoded 210 using FGS and traditional forward error correction (FEC) schemes. These bitstreams of the video are duplicated 220 into multiple streams 221–222 for every available path. In this way, the base layer and the low bit-rate enhancement layers are protected.

Partitioning of High Bit-Rate Enhancement Layers

The high bit-rate enhancement layers 213 are partitioned 230 into multiple partial low bit-rate bitstreams 231. Each one of the multiple partial low-bit-rate bitstreams is converted using a different one of the multiple descriptions 205 to take advantage of the multiple paths. Each path carries one of the multiple bitstreams description of the original high bit-rate enhancement layer 213. In this way, each partitioned low bit-rate enhancement layer 231 has a lower bit-rate when compared with the input high bit-rate enhancement layers 213. Thus, it possible to transmit 240 each partitioned bitstream 231 over a lower bit-rate path.

With the partitioning of the high bit-rate FGS enhancement layers 213, errors are reduced. If the information in one packet is lost, then similar information can be recovered from another path to improve the quality of the decoded video.

Bit Distribution

To partition the high bit-rate enhancement layers 213, we distribute "1" bits of the high bit-rate layer using different descriptions within the available bandwidth. A simple method distributes the "1" bits evenly among the multiple partial enhancement layers 231.

For example, if two paths are available, and an input block includes 64 bits

000011000101 . . . 110 then the "1" bits are evenly distributed into two descriptions as:

description1: 000010000100 . . . 100
description2: 000001000001 . . . 010.

Alternatively, the "1" bits are distributed according to their positions in the input block and their corresponding importance to the perceived visual quality of the video. For example, coefficients from the upper-left corner in the block significantly reflect luminance changes. Therefore, the corresponded "1" bits are duplicated in all of the partial layers, and the remaining "1" bits are assigned evenly among the partial layers.

Generally, if two paths are available, then a "1" bit in the input enhancement layer can be assigned to the $1^{st}$ partial layer, or to the $2^{nd}$ partial layer, or to both partial layers, or to neither partial layers, i.e., there are four possible choices. This yields different rates and distortions for each description. Therefore, rate-distortion optimization can determine how the "1" bits should be distributed. The manner in which the bits are distributed over the four choices is described in greater detail below.

Because different paths can have different available bandwidths and different packet loss characteristics, the partitioning of the enhancement layer can be performed as follows for two possible paths.

Trellis Search

First, distribute the appropriate number of bits to each image block 301 according to the available bandwidth. Then, for each block 301, apply a trellis search method 300 with four stages 311–314 to determine the distribution of the "1" bits for two paths.

When a "1" bit is encountered in the block 301, a new stage, i.e., "10" 311, "01" 312, "11" 313, and "00" 314 is used to determine whether the "1" bit is assigned to a $1^{st}$ partial layer, to a $2^{nd}$ partial layer, to both layers, or to none. For each stage, there are four possible incoming routes from a previous stage.

Cost Function

Each route has a corresponding cost function $$J(\lambda)=D(R_1,R_2,P_{loss})+\lambda(R_1+R_2),$$

where $R_1$ and $R_2$ are the numbers of bits produced up to the current stage in each partial layer, $P_{loss}$ is a parameters related to a status of the network 100, D(.) is an overall distortion of the two descriptions associated with the bit rate and the network status, and $\lambda$ is an empirical parameter specified according to the quantization parameter of the base layer block. The status can include an average packet loss ratio and a loss burst rate.

Then, the "1" bit is assigned according to the cost function that produces a minimum cost $J(\lambda)$. This process is repeated until a bit-budget for each description is satisfied.

With the multi-path transport of FGS videos according to the invention, the PSNR gain can be in the range of 2.0 to 2.6 dB, depending on the complexity of the input video.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for transporting a video over a network including multiple paths, comprising:
    encoding a video into a base layer, one or more low bit-rate enhancement layers, and one or more high bit-rate enhancement layers using fine-granularity scalability;
    duplicating the base layer and the low bit-rate layers into a plurality of base layers and a plurality of low bit-rate enhancement layers, respectively;
    partitioning the high bit-rate layers into a plurality of partial low-bit rate layers; and
    transmitting each of the plurality of base layers, the plurality of low bit-rate enhancement layers, and plurality of partial low-bit rate layers over a different path of the network.

2. The method of claim 1 wherein a difference between the low bit-rate and the high bit-rate is at least a factor of two.

3. The method of claim 1 wherein each high bit-rate enhancement layer is encoded using a different description.

4. The method of claim 1 wherein the partitioning further comprises:
    distributing "1" bits of the high bit-rate enhancement layer evenly among the plurality of partial low bit-rate enhancement layers.

5. The method of claim 1 wherein the partitioning further comprises:
    distributing "1" bits of the high bit-rate enhancement layer among the plurality of partial low bit-rate enhancement layers according to positions of the "1" bits in blocks of the high bit-rate enhancement layer.

6. The method of claim 1 wherein the partitioning further comprises:
    distributing "1" bits of the high bit-rate enhancement layer among the plurality of partial low bit-rate enhancement layers according to a perceived visual quality of the video.

7. The method of claim 1 wherein the partitioning further comprises:

evaluating a cost function to determine a partitioning of the "1" bits among the plurality of partial low-bit-rate enhancement layers.

8. The method of claim 7 wherein there are two partial low-bit-rate enhancement layers, and further comprising:
assigning a particular "1" bit to a first partial low-bit-rate enhancement layer, a second partial low-bit-rate enhancement layer, to both the first and second partial low-bit-rate enhancement layers, or neither partial low-bit-rate enhancement layers, depending on a minimum value of the cost function.

9. The method of claim 8 and the cost function is $$J(\lambda)=D(R_1,R_2,P_{loss})+\lambda(R_1+R_2),$$

where $R_1$ and $R_2$ are numbers of bits produced in each of the two partial low bit-rate enhancement layer, $P_{loss}$ is a parameters related to a status of the network, $D(.)$ is an overall distortion of the two partial low-bit-rate enhancement layers associated with a given bit-rate and the status of the network, and $\lambda$ is an empirical parameter specified according to a quantization parameter of a block of the base layer.

10. The method of claim 9 wherein the status includes an average packet loss ratio and a loss burst rate.

11. A system for transporting a video over a network including multiple paths, comprising:
an encoder configured to encode a video into a base layer, one or more low bit-rate enhancement layers, and one or more high bit-rate enhancement layers using fine-granularity scalability;
means for duplication the base layer and the low bit-rate layers into a plurality of base layers and a plurality of low bit-rate enhancement layers, respectively;
means for partitioning the high bit-rate layer into a plurality of partial low-bit rate layers; and
a transmitter configured to transmit each of the plurality of base layers, the plurality of low bit-rate enhancement layers, and plurality of partial low-bit rate layers over a different path of the network.

* * * * *